(12) United States Patent
Nomura

(10) Patent No.: US 8,269,906 B2
(45) Date of Patent: Sep. 18, 2012

(54) LIQUID CRYSTAL DISPLAY APPARATUS, ANTISTATIC METHOD FOR LIQUID CRYSTAL DISPLAY APPARATUS, AND ELECTRONIC APPARATUS

(75) Inventor: Morikazu Nomura, Aichi (JP)

(73) Assignee: Sony Corporation, Tokyo (JP)

( * ) Notice: Subject to any disclaimer, the term of this patent is extended or adjusted under 35 U.S.C. 154(b) by 256 days.

(21) Appl. No.: 12/684,631

(22) Filed: Jan. 8, 2010

(65) Prior Publication Data

US 2010/0182524 A1   Jul. 22, 2010

(30) Foreign Application Priority Data

Jan. 16, 2009   (JP) ................. P2009-007343

(51) Int. Cl.
*G02F 1/1333* (2006.01)
(52) U.S. Cl. .............................................. 349/40
(58) Field of Classification Search ............ 349/40
See application file for complete search history.

(56) References Cited

U.S. PATENT DOCUMENTS

| | | | |
|---|---|---|---|
| 6,525,786 B1 | 2/2003 | Ono | |
| 2006/0263588 A1* | 11/2006 | Handa et al. | 428/292.1 |
| 2010/0079692 A1* | 4/2010 | Hwang et al. | 349/40 |

FOREIGN PATENT DOCUMENTS

| | | |
|---|---|---|
| JP | 5 188388 | 7/1993 |
| JP | 11-149085 | 6/1999 |
| JP | 2000 171815 | 6/2000 |
| JP | 2001 147441 | 5/2001 |
| JP | 2008-145686 | 6/2008 |
| JP | 2008-233853 | 10/2008 |

\* cited by examiner

*Primary Examiner* — Phu Vu
(74) *Attorney, Agent, or Firm* — Frommer Lawrence & Haug LLP; William S. Frommer; Thomas F. Presson

(57) ABSTRACT

A transverse-electric-field liquid crystal display apparatus includes a transparent conductive resin portion and an electrode portion. The transparent conductive resin portion is provided on a surface of a counter substrate of a liquid crystal panel. The electrode portion is provided on an electrode pad portion of the liquid crystal panel and electrically connected to the transparent conductive resin portion and also to a ground wire of a printed circuit board connected to the liquid crystal panel.

4 Claims, 7 Drawing Sheets

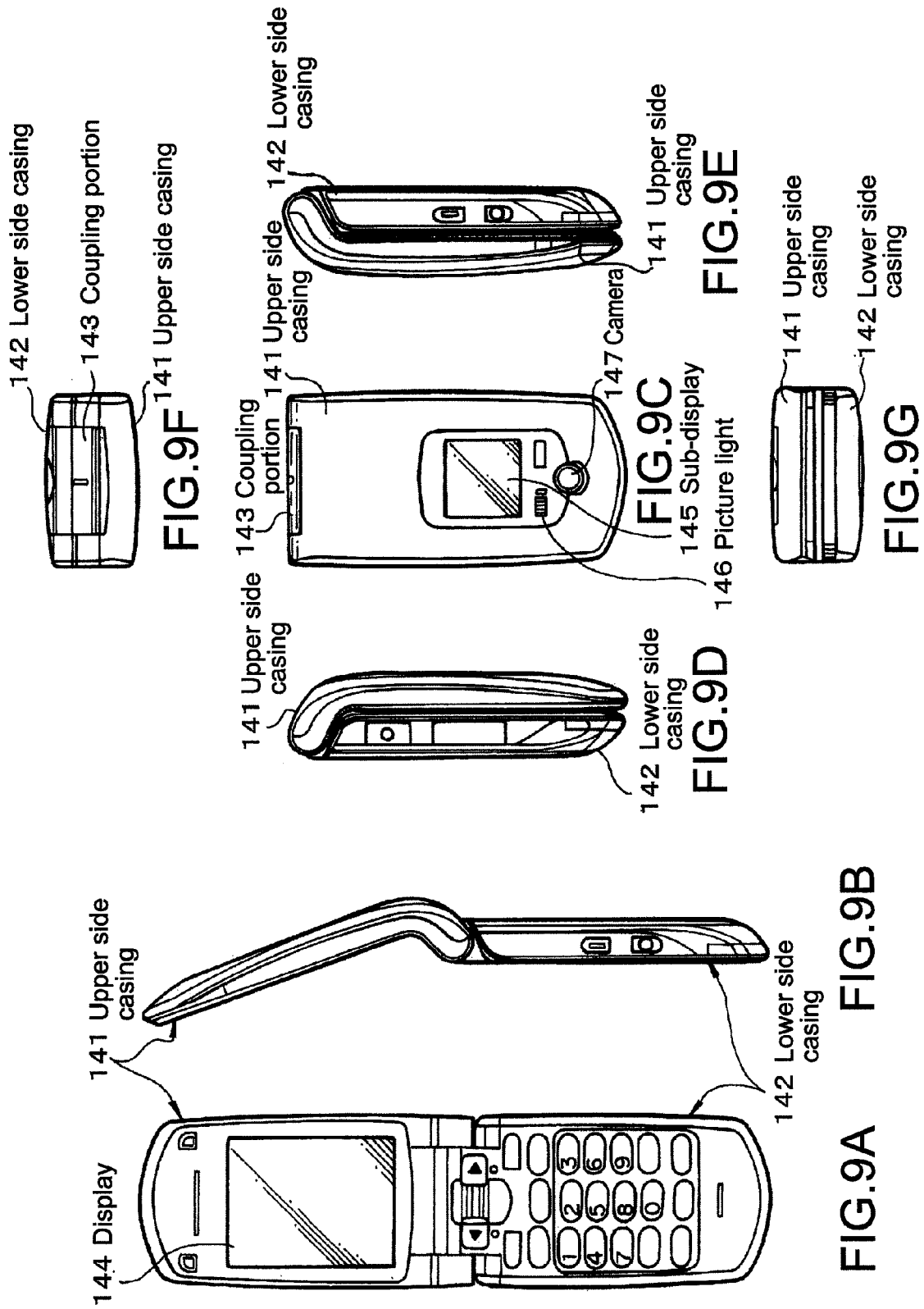

LIQUID CRYSTAL DISPLAY APPARATUS, ANTISTATIC METHOD FOR LIQUID CRYSTAL DISPLAY APPARATUS, AND ELECTRONIC APPARATUS

BACKGROUND OF THE INVENTION

1. Field of the Invention

The present invention relates to a liquid crystal display apparatus, an antistatic method for a liquid crystal display apparatus, and an electronic apparatus. In particularly, the present invention relates to a transverse-electric-field liquid crystal display apparatus, an antistatic method for a liquid crystal display apparatus, and an electronic apparatus including the liquid crystal display apparatus.

2. Description of the Related Art

A liquid crystal display apparatus mainly includes a liquid crystal panel formed by sealing in liquid crystal between two glass substrates, that is, a TFT (Thin Film Transistor) substrate and a counter substrate. Specifically, polarizing plates and phase different plates are provided above and below the liquid crystal panel, an electrode pad that receives input signals is connected with an IC and a film-like circuit substrate that are connected to a drive circuit side, and a backlight unit is provided on a lower surface thereof.

In a liquid crystal display apparatus, particularly, in a relatively-small liquid crystal display apparatus used in an electronic apparatus such as a cellular phone and a digital camera (hereinafter, referred to as "set"), a transparent protective cover for protecting the liquid crystal display apparatus that is fragile is provided on the set side. In order to particularly enhance merchantability due to compactification of components surrounding the liquid crystal display apparatus, thinning and reduction in weight of the liquid crystal display apparatus, reduction in size of a circumferential non-display area along with expansion of a display portion (so-called narrowing of frame) have been demanded in recent years.

On the other hand, in order to improve display characteristics such as a viewing angle, a chromatic change, contrast, and the like, a transverse electric field system such as an IPS (In-Plane Switching) mode and an FFS (Fringe Field Switching) mode has been widely applied to a liquid crystal panel. In the transverse electric field system, liquid crystal molecules turn parallel to substrates when applied a voltage. Therefore, in addition to a wide viewing angle, the transverse electric field system has a feature that a hue change depending on a viewing direction and a hue change in all gradation from white to black are caused less and natural images can be displayed even when seen from any direction from right to left or up and down.

However, as a problem of the transverse electric field system, there can be pointed out the fact that a common electrode is not arranged on the opposed substrate side but incorporated into the TFT substrate side and therefore charges are accumulated on the counter substrate side due to static electricity caused by a touch of a finger or the like. When charges are accumulated on the counter substrate side, liquid crystal molecules that should normally turn to a transverse direction in the transverse electric field system turn to a vertical direction due to an electric field generated by a vertical potential difference due to static electricity, which causes display unevenness.

To prevent this problem, it is necessary to take measures to provide an antistatic layer by, for example, forming a film made of ITO (Indium Tin Oxide) on a surface of the counter substrate side or applying a conductive coating to the polarizing plate. Further, to cause the charges to escape from the ITO film on the surface or the antistatic layer for polarizing plate, it is additionally necessary to obtain conduction to GND (ground). For the conduction, a GND wire may be extended to a metal frame in some cases by means of soldering, a conductive spacer, a conductive tape, and the like in a case where a conductive frame made of metal, a conductive resin, or a resin applied with the conductive coating is arranged so as to surround the antistatic layer for polarizing plate or the ITO film.

Specifically, a structure in which the polarizing plate having the antistatic layer comes into contact with a frame having conductivity and being made of metal or the like via a polarizing plate-frame contact conductive portion and is connected to GND (grounded) via the frame is adopted (see, for example, Japanese Patent Application Laid-open No. 05-188388; hereinafter, referred to as Patent Document 1). Further, a structure in which instead of the polarizing plate having the antistatic layer on a surface thereof, a transparent conductive film such as an ITO film is used on the counter substrate is adopted (see, for example, Japanese Patent Application Laid-open No. 2001-147441; hereinafter, referred to as Patent Document 2).

However, when there is an attempt to adopt a structure in which a transparent resin is applied between the protective cover on the set side and the liquid crystal display apparatus to integrate the protective cover and the liquid crystal display apparatus and a mechanical strength is thus ensured while suppressing interface reflection due to an air layer therebetween, the following problems are caused in related art of Patent Documents 1 and 2.

That is, due to interference of the frame and the conductive tape that are located above the surface of the liquid crystal panel, the integration of the protective cover using a transparent resin and thinning of the transparent resin layer are inhibited. In addition, when a thickness of the transparent resin layer becomes thick uselessly due to the interference of the frame and the conductive tape, display performance such as spectral characteristics and transmittance are liable to be affected. Therefore, the structures above may be difficult to be applied.

Moreover, in a structure in which static electricity accumulated on the surface of the liquid crystal panel is caused to escape to the frame side, it is necessary to take into consideration a GND connection between the frame and a casing on the set side or a printed circuit board. For example, that structure has a form similar to a method used, from the past, for preventing an erroneous operation of a drive IC due to static electricity, not for the transverse electric field system (see, for example, Japanese Patent Application Laid-open No. 2000-171815; hereinafter, referred to as Patent Document 3). In this case, screws, claws of a metal frame, a conductive tape, a metal film, and the like are used for the GND connection to the casing on the set side or the printed circuit board.

SUMMARY OF THE INVENTION

However, in any related art disclosed in Patent Documents 1 to 3, an area for a component added or a GND connection in a thickness direction or a width direction of the frame is needed, which results in impairing assemblability and merchantability from a viewpoint of a thickness or size.

In particular, dislike a liquid crystal display apparatus used for a laptop personal computer, a monitor, and a television, a small-size liquid crystal display apparatus for mobile equipment such as a cellular phone and a digital camera may not include a printed circuit board therein nor use a conductive frame made of metal or the like in many cases. Accordingly, related art in Patent Documents 1 to 3 is disadvantageous.

In this regard, there is a need for a liquid crystal display apparatus, an antistatic method for a liquid crystal display apparatus, and an electronic apparatus that are capable of realizing thinning of a liquid crystal panel and narrowing of a frame thereof while suppressing lowering of contrast due to interface reflection without impairing assemblability in a case where the transverse electric field system is adopted.

According to an embodiment of the present invention, there is provided a transverse-electric-field liquid crystal display apparatus in which a transparent conductive resin portion is provided on a surface of a counter substrate of a liquid crystal panel, and an electrode portion electrically connected to a ground wire of a printed circuit board connected to the liquid crystal panel is provided on an electrode pad portion of the liquid crystal panel and the electrode portion is electrically connected to the transparent conductive resin portion.

In the liquid crystal display apparatus having the structure described above, when the counter substrate is charged due to static electricity caused by a touch of a finger or the like and charges are thus accumulated, the charges escape to a ground of the set-side printed circuit board from the transparent conductive resin portion via the electrode portion on the electrode pad portion and a ground wire of the printed circuit board. Accordingly, it is unnecessary to provide a structure for ground using only the liquid crystal panel like the structure of related art adopting a grounding structure through a frame.

According to the embodiment of the present invention, it becomes unnecessary to provide a structure for ground using only the liquid crystal panel like the structure of related art adopting a grounding structure through the frame, with the result that it is possible to realize thinning of the liquid crystal panel and narrowing of a frame thereof while suppressing lowering of contrast due to interface reflection without impairing assemblability.

These and other objects, features and advantages of the present invention will become more apparent in light of the following detailed description of best mode embodiments thereof, as illustrated in the accompanying drawings.

BRIEF DESCRIPTION OF DRAWINGS

FIG. 6 are perspective views each showing an appearance of a digital camera to which the embodiments of the present invention are applied, in which

FIG. 9 are views each showing an appearance of a cellular phone to which the embodiments of the present invention are applied, in which FIG. 9A is a front view in an open state, FIG. 9B is a side view thereof, FIG. 9C is a front view in a closed state, FIG. 9D is a left-hand side view, FIG. 9E is a right-hand side view, FIG. 9F is a top view, and FIG. 9G is a bottom view.

DESCRIPTION OF PREFERRED EMBODIMENTS

Hereinafter, best modes for carrying out the invention (hereinafter, referred to as "embodiments") will be described in detail with reference to the drawings. It should be noted that descriptions will be given in the following order.

1. First embodiment (transparent conductive resin portion of single-layer structure)
2. Second embodiment (transparent conductive resin portion of multilayer structure)
3. Third embodiment (structure for suppressing in-plane electric resistance)
4. Modified example
5. Application example (electronic apparatus)

1. First Embodiment

Figure 1:
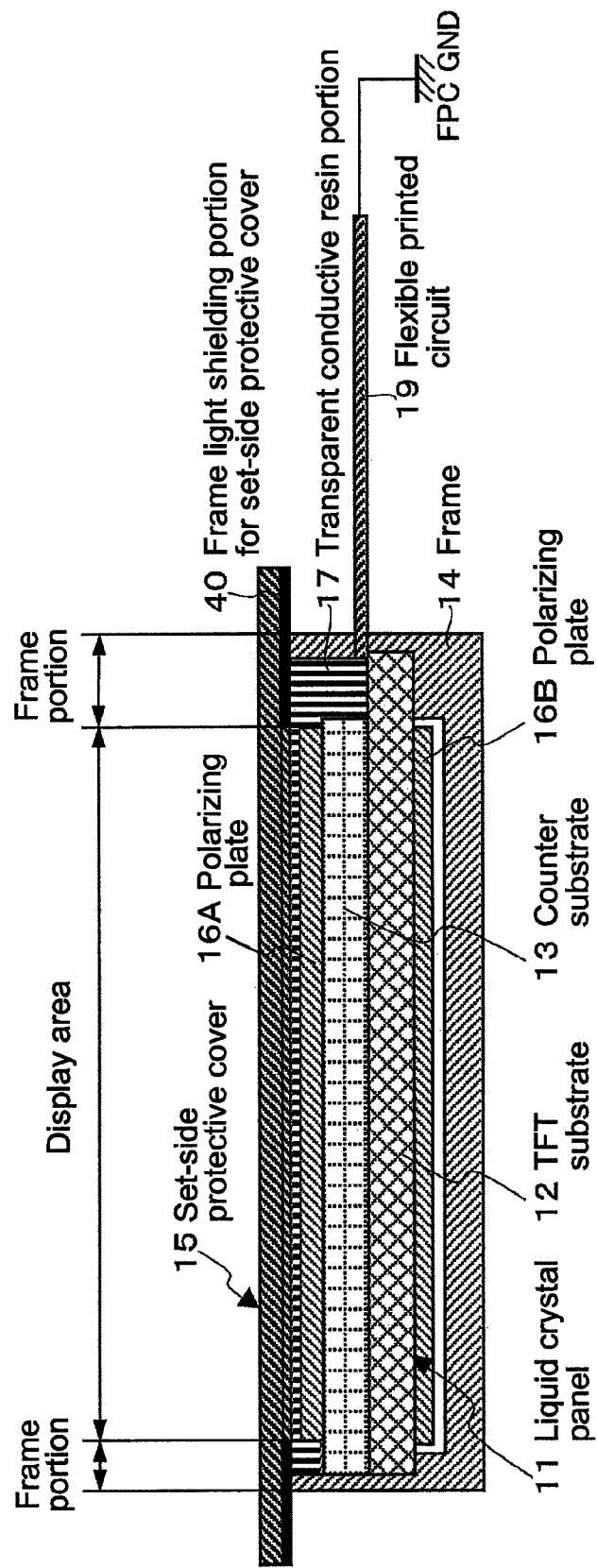
FIG. 1 is a transverse cross-sectional view showing a cross-sectional structure of a transverse-electric-field liquid crystal display apparatus according to a first embodiment of the present invention.
Figure 2:
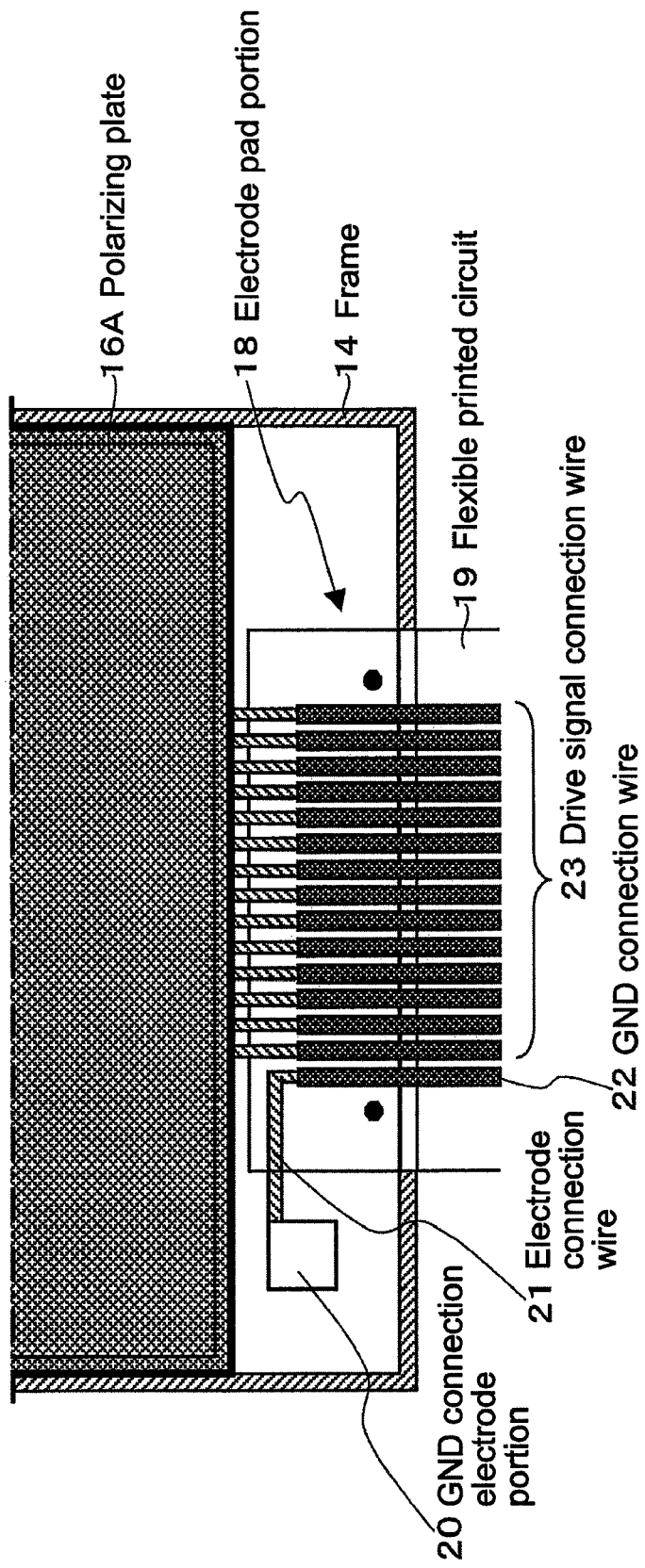
FIG. 2 is an enlarged view of an electrode pad portion seen from above the liquid crystal display apparatus according to the first embodiment.

FIG. 1 is a transverse cross-sectional view showing a cross-sectional structure of a transverse-electric-field liquid crystal display apparatus according to a first embodiment of the present invention. FIG. 2 is an enlarged view of an electrode pad portion seen from above.

In FIG. 2, a protective cover and the like that cover the electrode pad portion are not illustrated.

In FIG. 1, a liquid crystal panel 11 has a structure in which two glass substrates, that is, a TFT substrate 12 serving as a first substrate and a counter substrate 13 serving as a second substrate are bonded to each other and liquid crystal is sealed in between those two substrates 12 and 13. Here, pixel circuits including TFTs are formed on the TFT substrate 12 and a color filter, counter electrodes of pixels, and the like are formed on the counter substrate 13.

The liquid crystal panel 11 is accommodated in a frame 14 that also serves as a backlight unit and is protected by a transparent protective cover 15 mounted to an opening portion of the frame 14 (hereinafter, referred to as "set-side protective cover"). A polarizing plate 16A including an antistatic layer is provided on an upper surface side of the liquid crystal panel 11 and a polarizing plate 16B is provided on a lower surface side thereof.

Above a circumferential portion of the liquid crystal panel 11, a frame light shielding portion for set-side protective cover 40 is provided. The inner side of the frame light shielding portion for set-side protective cover 40 serves as a display area of the liquid crystal panel 11. Further, the outer side of the frame light shielding portion for set-side protective cover 40 serves as a frame portion of the liquid crystal panel 11.

A transparent conductive resin portion 17 having transparency and conductivity is provided between the liquid crystal panel 11 and the set-side protective cover 15. As a material of the transparent conductive resin portion 17, a conductive polymeric material or a resin in which conductive filler is dispersed (document; http://techon.nikkeibp.co.jp/article/NEWS/20070221/127999/) can be used, for example.

The conductive polymeric material (document; http://techon.nikkeibp.co.jp/article/WORD_LEAF/20050808/107465/) is typified by polyacetylene or polythiophene. The conductive polymeric material is also applied to fields of a resistive touch panel (document; http://techon.nikkeibp.co.jp/article/NEWS/20070612/134029/), an organic EL (Electro Luminescence), and an organic transistor.

In the embodiment of the present invention, the transverse-electric-field liquid crystal display apparatus has a structure in which the transparent conductive resin portion 17 is provided to allow charges to escape when the charges are accumulated on an apparatus surface due to static electricity generated by a touch of a finger or the like. Accordingly, high conductivity and frequency characteristics are unnecessary dislike the organic transistor, but it is desirable to ensure a film resistance (sheet resistance) of 1E9Ω/□ or less when measured by a four-terminal method in order to eliminate display unevenness due to charging for several seconds.

In FIG. 2, a GND connection electrode portion 20 that comes into contact with and conducts electricity to the transparent conductive resin portion 17 is secured in a free space of an electrode pad portion 18 in which an FPC (Flexible Printed Circuit) 19 and the like are not mounted. In other words, the GND connection electrode portion 20 on the electrode pad portion 18 is electrically connected to the transparent conductive resin portion 17.

The GND connection electrode portion 20 is electrically connected to an FPC-side GND connection wire 22 that is a ground wire formed on the FPC 19 via an electrode connection wire 21. The FPC-side GND connection wire 22 is connected to GND of a printed circuit board (not shown) on which an input circuit for driving a liquid crystal panel and the like are formed, the printed circuit board being on the set side outside the liquid crystal panel 11.

With this structure, the charges accumulated on the surface of the liquid crystal panel 11 escape to the ground of the printed circuit board on the set side (FPC GND) via the transparent conductive resin portion 17, the GND connection electrode portion 20, the electrode connection wire 21, and the FPC-side GND connection wire 22. In addition to the GND connection wire 22, drive signal connection wires 23 are arranged on the FPC 19.

The GND connection electrode portion 20 and the electrode connection wire 21 are formed simultaneously with the TFTs in a process using photolithography or the like for forming the TFT portion of the liquid crystal panel 11. In FIG. 2, a portion is provided as the GND connection electrode portion 20, though not limited thereto.

For example, when the FPC 19 is brought into press-contact with an anisotropic conductive film (ACF) or the like, the entire free space of the electrode pad portion 18 may be covered with a thin film such as an ITO for pixel electrodes, which is located on the uppermost layer of the TFT, for example, as long as an insulation state between electrodes can be secured. Further, the GND connection electrode portion formed of the thin film may also function as a guard wire for protecting circuits on the TFT substrate from static electricity.

As described above, the liquid crystal display apparatus according to the first embodiment has the structure in which the transparent conductive resin portion 17 is provided on a surface of the counter substrate 13, whereas the GND connection electrode portion 20 that is electrically connected to the transparent conductive resin portion 17 and the GND connection wire 22 is provided on the electrode pad portion 18. With this structure, the charges accumulated on the surface of the liquid crystal panel 11 escape to the ground of the printed circuit board on the set side via the transparent conductive resin portion 17, the GND connection electrode portion 20, the electrode connection wire 21, and the FPC-side GND connection wire 22.

In this way, by grounding the liquid crystal panel 11 via the FPC-side GND connection wire 22, it is unnecessary to provide a structure for GND connection using only the liquid crystal panel 11 like the structure of related art adopting a grounding structure through the frame 14. In addition, a GND connection portion to which mechanical loads are applied is eliminated and the liquid crystal panel 11 is covered with the transparent conductive resin portion 17, with the result that reliability of the set as a whole is increased.

Since depolarization characteristics can be ignored by applying the transparent conductive resin portion 17 to an upper portion of the polarizing plate 16A, there is no fear that display quality of the liquid crystal panel 11 is deteriorated. Further, in the film made of ITO, interface reflection is increased because a refractive index thereof is 1.8 or more, which is high, though depending on film formation conditions. Thus, transmittance/reflectivity loss and lowering of contrast under a bright environment are caused. In particular, in a case of coming into contact with air, a difference in refractive index is significant.

On the other hand, the transparent conductive resin portion 17 has a refractive index of about 1.3 to 1.8 (D-line, 589 nm). Thus, a difference in refractive index is not caused with the polarizing plate of the liquid crystal panel 11 side or the set-side protective cover 15 made of acrylic or the like, and accordingly the interface reflection is largely reduced.

By the combined structure of the transparent conductive resin portion 17 and the GND connection electrode portion 20, it is possible to realize thinning of the liquid crystal panel 11 and narrowing of the frame thereof while reducing structural groups for the GND connection in the transverse-electric-field liquid crystal panel 11 and enhancing assemblability.

In addition, it is also possible to lower the interface reflection on the air layer between the set-side protective cover 15 and the liquid crystal panel 11 and enhance display performance such as contrast and transmittance. Further, due to integration with the set-side protective cover 15, it is also possible to enhance shock resistance and environment resistance of the liquid crystal panel 11.

Incidentally, in the liquid crystal display apparatus according to the first embodiment, a single-layer transparent conductive resin portion 17 is formed between the set-side protective cover 15 and the liquid crystal panel 11. Generally, when conductivity of the transparent conductive resin portion 17 is attempted to be increased, the transparent conductive resin portion 17 made of conductive polymeric material is prone to be made thicker, which conflicts with the enhancement of the transmittance. Further, when the material of the transparent conductive resin portion 17 is a resin including conductive filler, a filling factor of the conductive filler is liable to be increased, which also conflicts with the enhancement of the transmittance.

On the other hand, in order to relieve stress due to mechanical stress applied to the liquid crystal panel 11 to thus facilitate assembly of the set-side protective cover 15 and the liquid crystal panel 11, it is advantageous to impart thickness and flexibility to the transparent conductive resin portion 17.

An antistatic structure for optimizing those conflicting demands not from a viewpoint of materials but from a structural viewpoint will be described below as a second embodiment.

2. Second Embodiment

Figure 3:
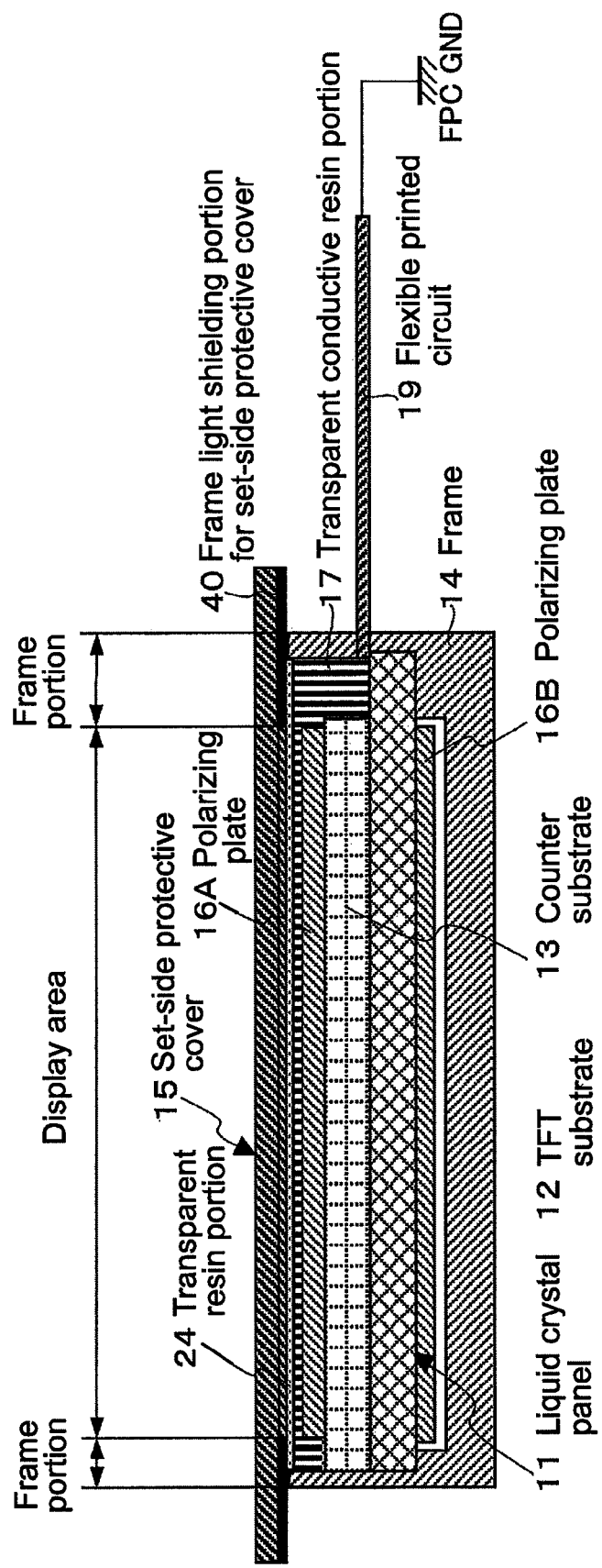
FIG. 3 is a transverse cross-sectional view showing a cross-sectional structure of a transverse-electric-field liquid crystal display apparatus according to a second embodiment of the present invention.

FIG. 3 is a transverse cross-sectional view showing a cross-sectional structure of a transverse-electric-field liquid crystal display apparatus according to a second embodiment of the present invention. In FIG. 3, the same portions as those in FIG. 1 are denoted by the same reference symbols.

In the liquid crystal display apparatus according to the first embodiment, the transparent conductive resin portion 17 formed between the set-side protective cover 15 and the liquid crystal panel 11 has a single-layer antistatic structure. In contrast to this, in the liquid crystal display apparatus according to this embodiment, the transparent conductive resin portion 17 has a multilayer structure, for example, two-layer antistatic structure.

Specifically, the liquid crystal display apparatus according to this embodiment has a structure in which a transparent resin portion 24 is provided between the transparent conductive resin portion 17 and the set-side protective cover 15. The transparent resin portion 24 has a function as a binding agent (binder) for integrating the transparent conductive resin portion 17 and the set-side protective cover 15. The transparent conductive resin portion 17 satisfies both conductivity and transmittance, whereas the transparent resin portion 24 satisfies both transmittance and assemblability.

As described above, through the intermediation of the transparent resin portion 24 satisfying both transmittance and assemblability between the transparent conductive resin portion 17 and the set-side protective cover 15, it is possible to more reliably integrate the transparent conductive resin portion 17 and the set-side protective cover 15. Accordingly, the conflicting demands to enhance both the conductivity and the transmittance can be satisfied in the transverse-electric-field liquid crystal display apparatus, with the result that it is possible to easily realize an optimum balance among transmittance, conductivity, and assemblability.

It should be noted that though in this embodiment, the example in which the transparent resin portion provided between the set-side protective cover 15 and the liquid crystal panel 11 has the two-layer structure has been described, the transparent resin portion may have a multilayer structure of three layers or more. However, in the multilayer structure, it is important that at least one of the three layers or more is formed of a transparent resin having conductivity and a layer on the set-side protective cover 15 side is formed of a transparent resin having a function as a binder.

3. Third Embodiment

Figure 4:
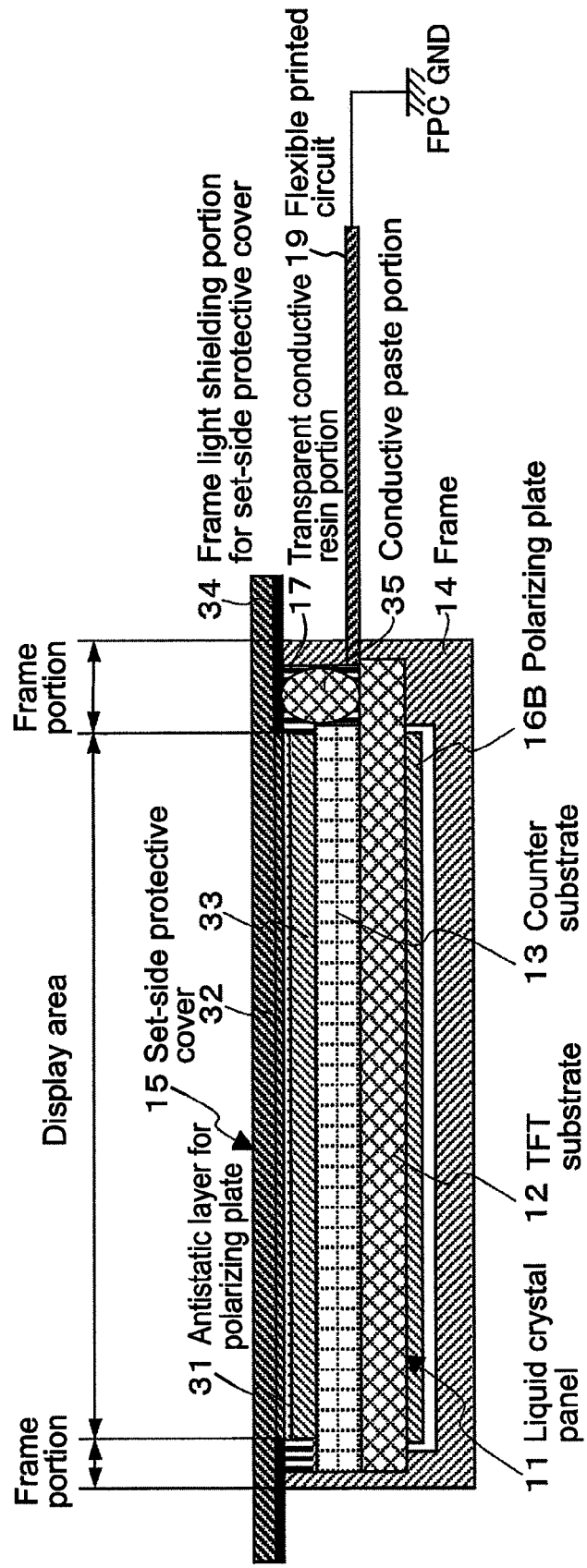
FIG. 4 is a transverse cross-sectional view showing a cross-sectional structure of a transverse-electric-field liquid crystal display apparatus according to a third embodiment of the present invention.

FIG. 4 is a transverse cross-sectional view showing a cross-sectional structure of a transverse-electric-field liquid crystal display apparatus according to a third embodiment of the present invention. In FIG. 4, the same portions as those in FIG. 1 are denoted by the same reference symbols.

The liquid crystal display apparatus according to this embodiment adopts a structure for suppressing an in-plane electric resistance on an upper surface of the liquid crystal panel 11, in addition to the antistatic structure for causing charges to escape from the surface of the liquid crystal panel 11 according to the first and second embodiments.

Specifically, a structure in which in addition to the transparent conductive resin portion 17, a different conductive portion having a lower resistance than the transparent conductive resin portion 17 is complexly combined to thus enhance conductivity is adopted. The different conductive portion having a lower resistance than the transparent conductive resin portion 17 is provided between the transparent protective cover 15 and the GND connection electrode portion 20.

Examples of the structure in which the different conductive portion is complexly combined includes:
a case of being combined with a conductive antistatic layer for polarizing plate 31;
a case of being combined with an ITO film 32 formed on the surface of the counter substrate 13 (counter substrate surface ITO film);
a case of being combined with an ITO film 33 formed on a back surface of the set-side protective cover 15 (set-side protective cover back surface conductive ITO film);
a case of being combined with a frame light shielding portion 34 formed of a low resistance metal or resin around the set-side protective cover 15 (conductive frame light shielding portion for set-side protective cover); and
a case of directly connecting a back-surface conductive portion of the set-side protective cover 15 and the GND connection electrode portion 20 of the liquid crystal panel 11 with use of a conductive paste portion 35 as structured by mixing metal filler and fiber.

In any example of the structures in which the different conductive portion is complexly combined, it is possible to decrease a total ground resistance value from the surface of the liquid crystal panel 11 to GND while partially interposing the transparent conductive resin portion 17, with the result that the antistatic performance can be enhanced more.

4. Modified Example

It should be noted that regarding the description of the ITO film in the third embodiment, the film may be formed by applying the transparent conductive resin or sputtering a zinc-oxide-based transparent conductive film or the like as in the first and second embodiments.

5. Application Example

The liquid crystal display apparatuses according to the embodiments of the present invention described above can be applied to a display apparatus of an electronic apparatuses in any field, the display apparatus displaying video signals input thereto or generated therein as images or videos.

According to the liquid crystal display apparatuses of the embodiments of the present invention, it is possible to realize thinning of the liquid crystal panel and narrowing of the frame while suppressing lowering of contrast due to the interface reflection. Accordingly, by using the transverse-electric-field liquid crystal display apparatuses according to the embodiments of the present invention as a display apparatus of an electronic apparatus in any field, it is possible to achieve enhancement of display characteristics such as a viewing angle, a chromatic change, contrast, and the like of the display apparatus of the electronic apparatus and furthermore, it is possible to realize thinning and downsizing of the electronic apparatus.

The liquid crystal display apparatuses according to the embodiments of the present invention also include a liquid crystal display apparatus having a module shape that is a sealed structure. The module-shaped liquid crystal display apparatus corresponds to, for example, a display module that is provided with a sealing portion (not shown) so as to surround a pixel array portion and is formed by being bonded to a counter portion made of transparent glass or the like with the sealing portion used as a bonding agent. The transparent counter portion may be provided with a color filter, a protective film, or the light-shielding film as described above. It should be noted that the display module may be provided with a circuit portion for inputting/outputting signals or the like between the outside and the pixel array portion, an FPC, and the like.

(Electronic Apparatus)

Hereinafter, specific examples of electronic apparatuses to which the embodiments of the present invention are applied will be described. As examples, the embodiments of the present invention are applicable to various electronic apparatuses shown in FIGS. 5 to 9, for example, display apparatuses of a digital camera, a laptop personal computer, a mobile terminal apparatus such as a cellular phone, and a video camera.

Figure 5:
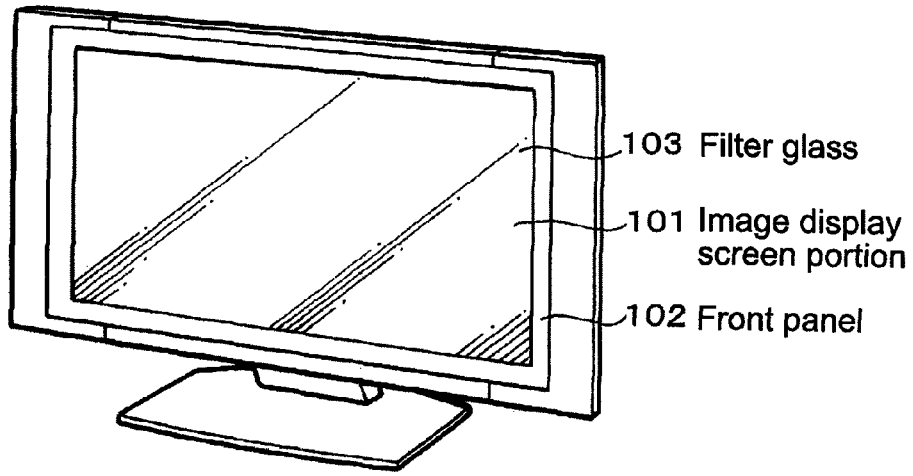
FIG. 5 is a perspective view showing an appearance of a television set to which the embodiments of the present invention are applied.

FIG. 5 is a perspective view showing an appearance of a television set to which the embodiments of the present invention are applied. The television set of this application example includes an image display screen portion 101 constituted of a front panel 102, a filter glass 103, and the like. The television set of this application example is produced using the liquid crystal display apparatus according to the embodiments of the present invention as the image display screen portion 101.

Figure 6A:
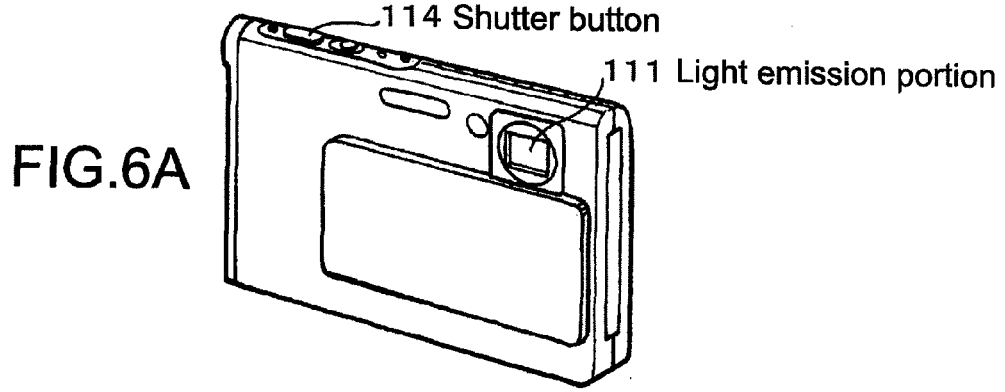
FIG. 6A is a perspective view seen from a front side and FIG. 6B is a perspective view seen from a back side.
Figure 6B:
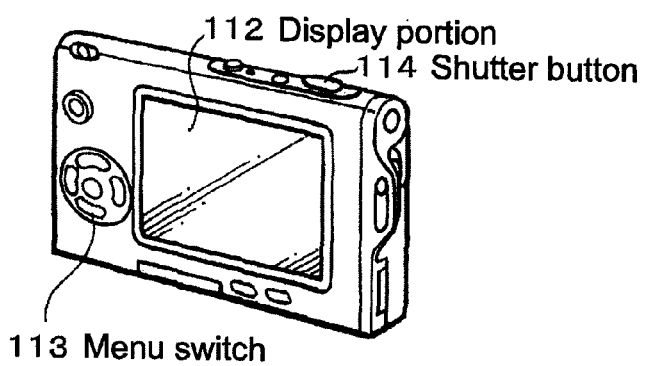

FIG. 6 are perspective views each showing an appearance of a digital camera to which the embodiments of the present invention are applied, in which FIG. 6A is a perspective view seen from a front side and FIG. 6B is a perspective view seen from a back side. The digital camera of this application example includes a light emission portion for flash 111, a display portion 112, a menu switch 113, a shutter button 114, and the like. The digital camera of this application example is produced using the liquid crystal display apparatus according to the embodiments of the present invention as the display portion 112.

Figure 7:
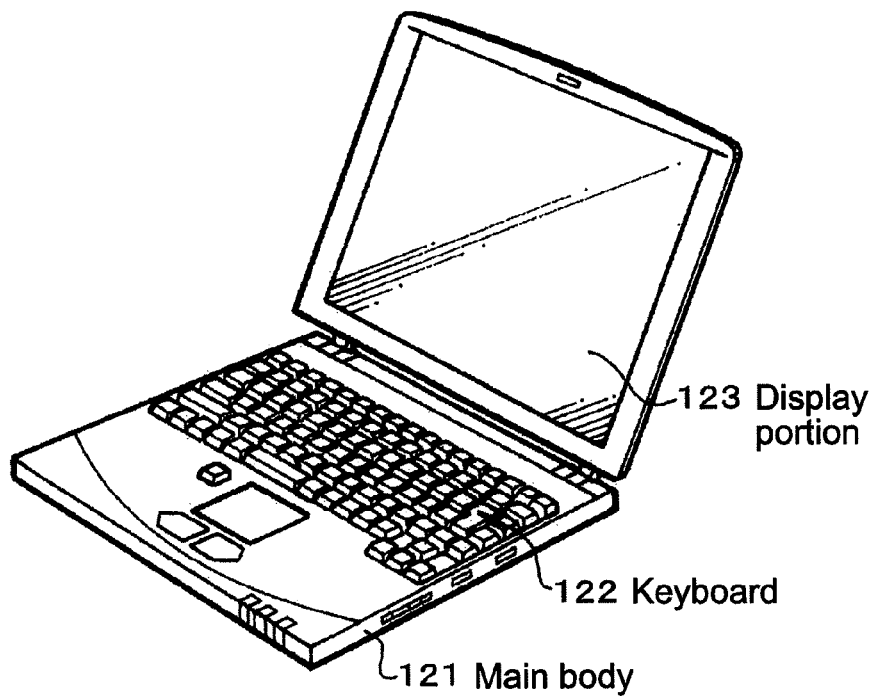
FIG. 7 is a perspective view showing an appearance of a laptop personal computer to which the embodiments of the present invention are applied.

FIG. 7 is a perspective view showing an appearance of a laptop personal computer to which the embodiments of the present invention are applied. The laptop personal computer of this application example includes a main body 121, a keyboard 122 that is operated in inputting letters or the like, a display portion 123 for displaying images, and the like. The laptop personal computer of this application example is produced using the liquid crystal display apparatus according to the embodiments of the present invention as the display portion 123.

Figure 8:
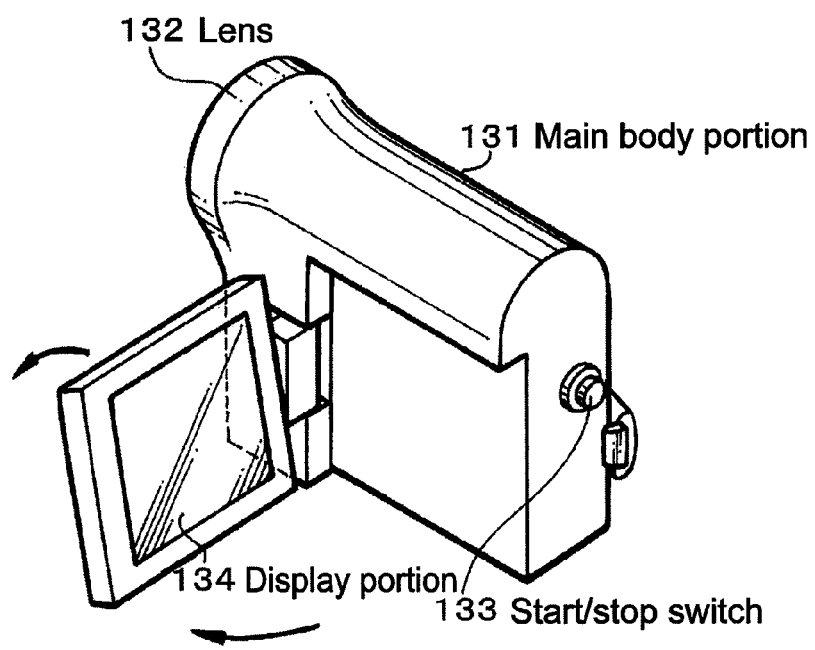
FIG. 8 is a perspective view showing an appearance of a video camera to which the embodiments of the present invention are applied.

FIG. 8 is a perspective view showing an appearance of a video camera to which the embodiments of the present invention are applied. The video camera of this application example includes a main body portion 131, a lens 132 for photographing a subject, the lens 132 being provided on a side surface seen in the figure, a start/stop switch for photographing 133, a display portion 134, and the like. The video camera of this application example is produced using the liquid crystal display apparatus according to the embodiments of the present invention as the display portion 134.

FIG. 9 are views each showing an appearance of a mobile terminal apparatus, for example, a cellular phone, to which the embodiments of the present invention are applied, in which FIG. 9A is a front view in an open state, FIG. 9B is a side view thereof, FIG. 9C is a front view in a closed state, FIG. 9D is a left-hand side view, FIG. 9E is a right-hand side view, FIG. 9F is a top view, and FIG. 9G is a bottom view.

The cellular phone of this application example includes an upper side casing 141, a lower side casing 142, a coupling portion (in this case, hinge portion) 143, a display 144, a sub-display 145, a picture light 146, a camera 147, an the like. The cellular phone of this application example is produced using the liquid crystal display apparatus according to the embodiments of the present invention as the display 144 and the sub-display 145.

The present application contains subject matter related to that disclosed in Japanese Priority Patent Application JP 2009-007343 filed in the Japan Patent Office on Jan. 16, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A transverse-electric-field liquid crystal display apparatus, comprising:
    a transparent conductive resin portion that is provided on a surface of a counter substrate of a liquid crystal panel;
    an electrode portion that is provided on an electrode pad portion of the liquid crystal panel and electrically connected to the transparent conductive resin portion and also to a ground wire of a printed circuit board connected to the liquid crystal panel, wherein the transparent conductive resin portion is provided between the liquid crystal panel and a transparent protective cover that protects the liquid crystal panel; and
    a conductive portion that is provided between the transparent protective cover and the electrode portion and has a lower resistance than that of the transparent conductive resin portion.

2. The transverse-electric-field liquid crystal display apparatus according to claim 1, further comprising
    a transparent resin portion that is provided between the transparent conductive resin portion and the transparent protective cover and functions as a binding agent.

3. An antistatic method for a transverse-electric-field liquid crystal display apparatus, comprising:
    providing a transparent conductive resin portion on a surface of a counter substrate of a liquid crystal panel;
    providing an electrode portion electrically connected to a ground wire of a printed circuit board connected to the liquid crystal panel on an electrode pad portion of the liquid crystal panel, and electrically connecting the electrode portion to the transparent conductive resin portion, wherein the transparent conductive resin portion is provided between the liquid crystal panel and a transparent protective cover that protects the liquid crystal panel; and
    providing a conductive portion between the transparent protective cover and the electrode portion, wherein the conductive portion has a lower resistance than that of the transparent conductive resin portion.

4. An electronic apparatus including a transverse-electric-field liquid crystal display apparatus, comprising:
    a transparent conductive resin portion that is provided on a surface of a counter substrate of a liquid crystal panel;
    an electrode portion that is provided on an electrode pad portion of the liquid crystal panel and electrically connected to the transparent conductive resin portion and also to a ground wire of a printed circuit board connected to the liquid crystal panel, wherein the transparent conductive resin portion is provided between the liquid crystal panel and a transparent protective cover that protects the liquid crystal panel; and
    a conductive portion that is provided between the transparent protective cover and the electrode portion and has a lower resistance than that of the transparent conductive resin portion.

* * * * *